United States Patent Office 2,834,780
Patented May 13, 1958

2,834,780
PHTHALIDYL PIPERAZINES

Donald D. Wheeler and David C. Young, Midland, Mich., assignors to The Dow Chemical Company, Midland, Mich., a corporation of Delaware No Drawing. Application July 5, 1956
Serial No. 595,844

4 Claims. (Cl. 260—268)

This invention is concerned with phthalidyl piperazines having the formula

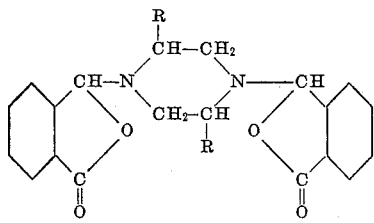

In this and succeeding formulae, each R is a member of the group consisting of hydrogen and methyl. The new compounds are white or cream-colored solids somewhat soluble in certain organic solvents such as acetone and substantially insoluble in water. These compounds have utility as antimicrobial agents and are adapted to be employed in germicidal and antiseptic compositions.

The above compounds may be prepared by causing phthalaldehydic acid to react with a piperazine having the formula

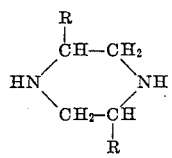

to produce the desired phthalidyl piperazines and water of reaction. The terms "phthalaldehydic acid" and "3-hydroxyphthalide" refer to a compound having the structure

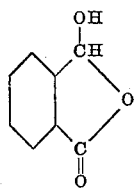

Phthalaldehydic acid is often represented in the literature as having an open-ring structure

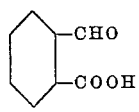

However, the acid employed in this invention and prepared as hereinafter described exists almost entirely in the 3-hydroxyphthalide ring structure as indicated by its infrared absorption spectrum. Infrared data also indicate the phthalide products to have a ring structure.

The reaction takes place readily in the temperature range of from 20° to 150° C. It is preferably carried out in an inert solvent as reaction medium. Suitable solvents include acetone, butanone and water. Good results are obtained when substantially equivalent proportions of the reactants are employed, however a reasonable excess of either reactant does not interfere with the reaction. A large excess of phthalaldehydic acid particularly at elevated temperature may form an anhydride by-product.

In the preferred method of carrying out the reaction, the phthalaldehydic acid and the appropriate piperazine are dissolved in water and the resulting solution heated for a period of from a few minutes to one hour. The desired phthalidyl piperazine product usually precipitates during the heating process. After completion of the heating, the mixture is allowed to cool and the product recovered therefrom by filtration. The latter may be purified, if desired, by washing with water or appropriate solvent.

The following examples illustrate the invention but are not to be construed as limiting.

*Example 1.—1,4-diphthalidylpiperazine*

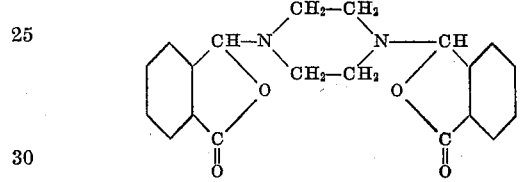

A solution of 60 grams (0.4 mole) of phthalaldehydic acid in 200 milliliters of warm water was mixed with a solution of 20.8 grams (0.2 mole) of piperazine hydrate in 100 milliliters of warm water. On mixing a somewhat cloudy solution formed. The latter was heated on the steam bath for 0.5 hour during which time a fine flocculant solid started to precipitate and finally formed a thick slurry. The mixture was cooled and a 1,4-diphthalidylpiperazine product separated therefrom by filtration. The latter, after washing with water and drying, melted at 273°–275° C.

*Example 2.—2,5-dimethyl-1,4-diphthalidylpiperazine*

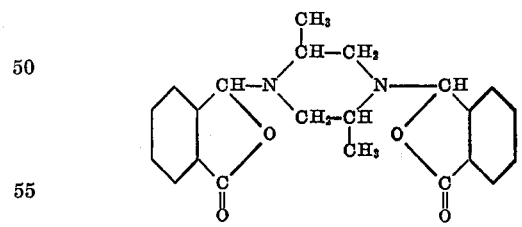

15.6 grams (0.15 mole) of 2,5-dimethylpiperazine, and 45.0 grams (0.30 mole) of phthalaldehydic acid were dissolved in 100 milliliters of water and heated. After about 5 minutes, a solid began to form and precipitate from the reaction mixture. After heating for an additional 10 minutes, the mixture was cooled and filtered to obtain a solid 2,5-dimethyl-1,4-diphthalidylpiperazine product. The latter, after washing with water and drying, melted at 292°–293° C. and was obtained in the amount of 44 grams or 80 percent of theoretical yield.

The products of the present invention have antimicrobial activity and are adapted to be employed in germicidal compositions. In a representative operation, a solid nutrient agar medium saturated with 2,5-dimethyl-1,4-diphthalidylpiperazine gave complete inhibition of growth when streaked with *Staphylococcus aureus* and incubated at 30° C. for three days.

The phthalaldehydic acid employed in this invention may be prepared by first photochlorinating o-xylene to obtain α,α,α,α',α'-pentachloro-o-xylene by passing chlorine gas into o-xylene while illuminating with sun lamps. The resulting chlorinated o-xylene may be heated with an aqueous constant-boiling hydrochloric acid and ferric chloride solution to obtain phthalaldehydic acid as more fully disclosed in U. S. Patent 2,748,162.

We claim:

1. A phthalidyl piperazine having the formula

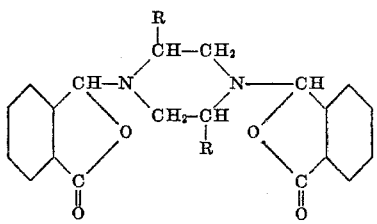

wherein each R is a member of the group consisting of hydrogen and methyl.

2. 1,4-diphthalidylpiperazine.

3. 2,5-dimethyl-1,4-diphthalidylpiperazine.

4. A method for preparing a phthalidyl piperazine having the formula

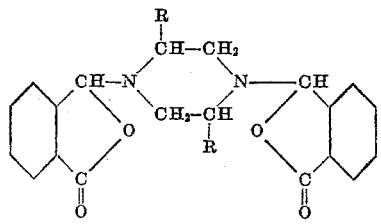

wherein each R is a member of the group consisting of hydrogen and methyl, which comprises the step of mixing phthalaldehydic acid and a piperazine having the formula

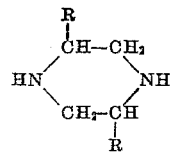

wherein R is as above defined and maintaining the mixture at a temperature of from 20° to 150° C. for a time sufficient to allow completion of the reaction.

No references cited.